(12) United States Patent
Chaterjee et al.

(10) Patent No.: US 8,949,290 B2
(45) Date of Patent: Feb. 3, 2015

(54) REAL TIME PERFORMANCE MONITORING (71) Applicant: Tata Consultancy Services Limited, Mumbai, Maharahtra (IN)

(72) Inventors: Swarup Chaterjee, Kolkata (IN); Ramkumar Ilangovan, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 190 days.

(21) Appl. No.: 13/755,693

(22) Filed: Jan. 31, 2013

(65) Prior Publication Data
US 2013/0204911 A1 Aug. 8, 2013

(30) Foreign Application Priority Data

Feb. 2, 2012 (IN) .......................... 318/MUM/2012

(51) Int. Cl.
*G06F 7/00* (2006.01)
*G06F 17/30* (2006.01)
*G06F 11/34* (2006.01)

(52) U.S. Cl.
CPC .......... *G06F 17/30312* (2013.01); *G06F 11/34* (2013.01)
USPC .......... 707/809; 707/812; 709/224; 717/124; 717/127; 717/131

(58) Field of Classification Search
USPC ........... 707/809, 812; 709/224; 717/124, 127, 717/131
See application file for complete search history.

(56) References Cited

U.S. PATENT DOCUMENTS

| 5,224,212 | A | 6/1993 | Rosenthal et al. | |
|---|---|---|---|---|
| 5,938,734 | A | 8/1999 | Yao et al. | |
| 7,559,053 | B2 * | 7/2009 | Krassovsky et al. | 717/126 |
| 2003/0046383 | A1 * | 3/2003 | Lee et al. | 709/224 |
| 2004/0267691 | A1 * | 12/2004 | Vasudeva | 707/1 |
| 2009/0150542 | A1 * | 6/2009 | Yahiro et al. | 709/224 |
| 2010/0332646 | A1 * | 12/2010 | Balasubramanian et al. | 709/224 |
| 2013/0139130 | A1 * | 5/2013 | Anjan et al. | 717/131 |

* cited by examiner

*Primary Examiner* — Hares Jami
(74) *Attorney, Agent, or Firm* — Hamre, Schumann, Mueller & Larson, P.C.

(57) ABSTRACT

Systems and methods for real time performance monitoring of an application are described. In one implementation, when a metrics collection request is obtained from a user device, a data storage location is selected from a plurality of data storage locations based on a location status associated with the data storage location. The metrics data, for monitoring the performance of the application, is then provided to the user device through a data store from the selected data storage location in real time.

17 Claims, 5 Drawing Sheets

Fig. 4

REAL TIME PERFORMANCE MONITORING

TECHNICAL FIELD

The present subject matter relates to monitoring of performance and particularly, not exclusively, relates to real time monitoring of performance of applications executed on a computing device.

BACKGROUND

Generally, performance testing of an application may be done in order to check for reliability, scalability, and resource utilization of the application. The performance of the application may be tested on the basis of performance metrics. The performance metrics are benchmarks on the basis of which the application is tested for performance and efficiency. The performance metrics may include Central Processing Unit (CPU) usage, instructions executed per second, and the like.

In order to efficiently test and monitor the application, the data pertaining to the performance metrics may be monitored in real time. Such data may be referred to as metrics data. For real-time monitoring, the metrics data are collected simultaneously with the ongoing testing of the application and made available to a user who is testing the application.

However, as the volume of the collected metrics data is usually quite large, data loss may occur while transferring the metrics data in real time. Any loss in metrics data may result in reporting of inaccurate results of the performance testing of the application. Further, often times, real time data monitoring increases the overhead of the machine in which the application is running, hence decreasing the computational efficiency of the machine.

SUMMARY

This summary is provided to introduce concepts related to a method for real time performance monitoring and the concepts are further described below in the detailed description. This summary is neither intended to identify essential features of the claimed subject matter nor is it intended for use in determining or limiting the scope of the claimed subject matter.

In an embodiment of the present subject matter, method(s) and system(s) for real time performance monitoring of an application is described. The method comprises receiving, from a user device, a metrics collection request associated with the application. The metrics are attributes, based on which the application is tested for performance. The method may further comprise, selecting a data storage location from a plurality of data storage locations after the metrics collection request is received. In an embodiment, the selection of the data storage location may be based on a location status associated with each of the plurality of data storage locations. Furthermore, the method may comprise providing the collected metrics from the selected data storage location to the user device via a data store.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to a method for real time performance monitoring. Performance monitoring of an application is typically done to test the application for its efficiency and performance. The performance monitoring of the application may be based on a plurality of performance metrics. The performance metrics are attributes on the basis of which the application is tested and judged for its overall performance, reliability, and scalability. The performance metrics may be referred to as metrics hereinafter. The metrics may include Central Processing Unit (CPU) usage, memory usage, instructions executed per second, and the like.

Performance monitoring of any application may include collecting metrics and transferring the collected metrics to a user device. For performance monitoring in real time, the collected metrics may be transferred to the user device simultaneously with the ongoing testing of the application. Conventional techniques for real time performance monitoring of any application may include transferring the collected metrics, to the user device, through a fixed bandwidth over a network. The transfer of the collected metrics to the user device in real time over the network may be realized by attaching dedicated sockets or agents to the application being tested. Using sockets or agents for transferring the collected metrics directly to the user device in the network often increases an overhead of the machine in which the application is running The overhead may be increased because data processing of the agents, execution of the application, and monitoring of the application are done concurrently within the same machine. Though centralized databases can minimize the overhead due to data processing of the agents, but performing database updates for each collected metric may increase the overhead of the machine due to repeated synchronization of the application and the centralized database. Further, transferring the collected metrics in real time over a fixed bandwidth may result in loss of data as the volume of the collected metrics is typically quite large.

According to an embodiment of the present subject matter, system(s) and method(s) for real time performance monitoring of an application are described herein. The present subject matter provides for loss less and accurate transfer of the metrics in real time. In one implementation, when a request for display of the collected metrics is received from a user device, a selection mechanism may be triggered. Such a mechanism may be provided for selecting a data storage location from a plurality of data storage locations used for collecting the metrics. The selection mechanism facilitates simultaneous read and write operations, for collecting and transferring the metrics at the same time, thus making the system efficient in terms of computational time and resources.

In an example, the selection of the data storage location is based on a data transfer status. The data transfer status corresponds to whether the collected metrics were successfully transferred to the user device from the data storage location that was selected at the previous data transfer cycle. In an implementation, after the selection of the data storage location, a location status of the selected data storage location is set as read-only. Meanwhile, the location status of other data storage locations may be write-only. Further, the collected metrics are transferred to the user device, only from the data storage location having the location status of read-only. In an example, the metrics collected from the selected data storage location may be directly transferred to one or more user devices. In another example, the metrics from the selected data storage location may be transferred to a data store and from the data store the metrics may be read by user devices.

Further, the metrics for the ongoing testing phase are simultaneously collected in the data storage locations having location status of write-only. In an implementation, if the transfer of the collected metrics had failed in a previous metrics collection request, then the selection mechanism may be bypassed and the collected metrics, corresponding to the previous metrics collection request, are preserved in the data storage location, selected at the previous metrics collection request, until successfully transferred. Such a provision ensures loss less data transfer.

For the purpose of explanation and not as a limitation, the present subject matter may be described in considerable detail with reference to testing of an application in "JAVA™". It will be understood that the present subject matter can be extended to applications written in other languages as well.

Figure 1:
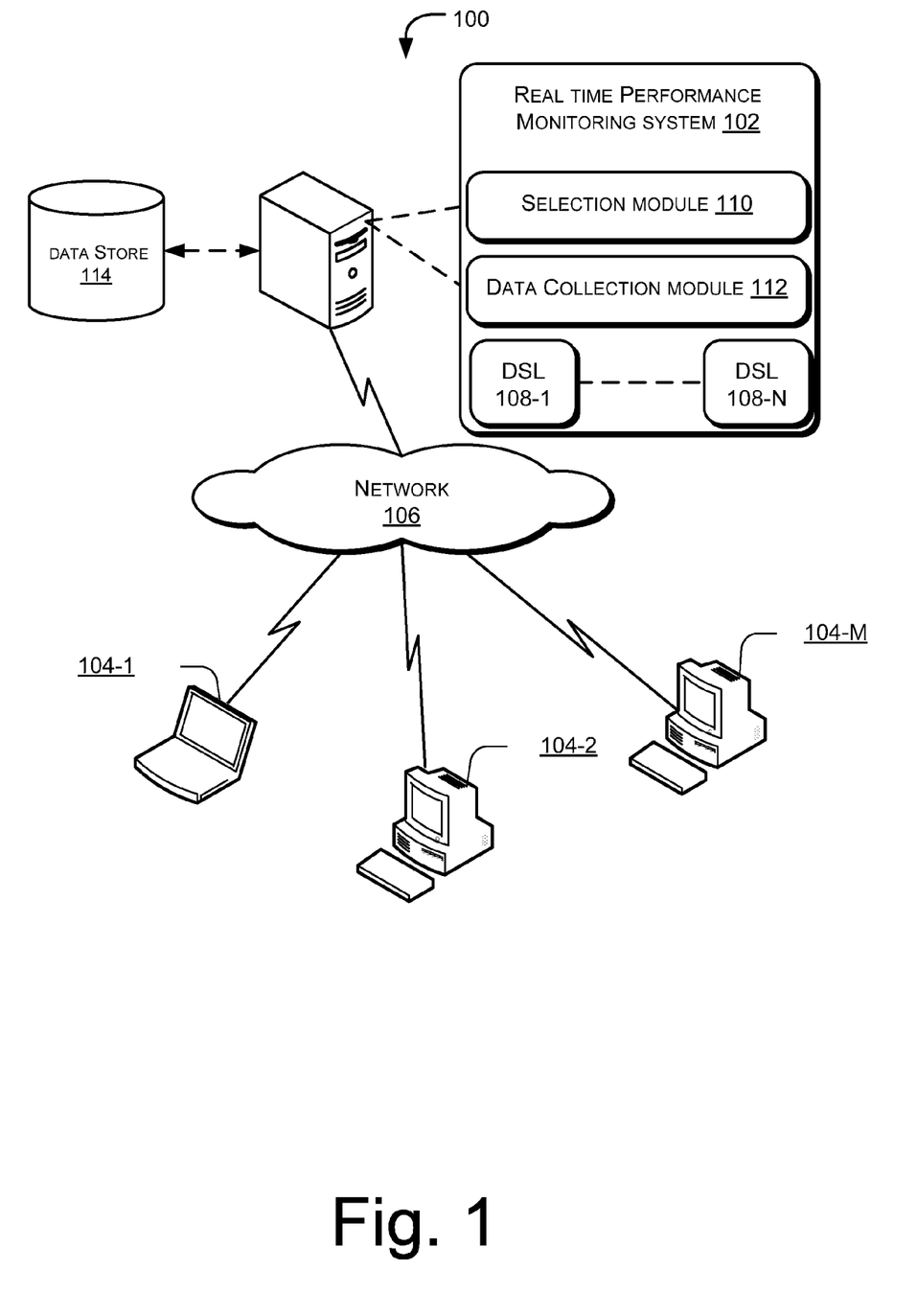
FIG. 1 illustrates a network environment implementing a real time performance monitoring system, according to an implementation of the present subject matter.

In an embodiment, the application to be tested may be running as a JAVA™ Virtual Machine (JVM). The application may be tested for a plurality of metrics. In an implementation, the application to be tested and the real time performance monitoring system may be running as separate JVMs in the same machine. Such an arrangement increases the efficiency with respect to computational time as well decreases the overhead of the JVM in which the application is running FIG. 1 illustrates a computing environment 100 implementing a real time performance monitoring system 102, according to an embodiment of the present subject matter. The computing environment 100 includes at least one real time performance monitoring system 102 connected to one or more user devices 104-1, 104-2, . . . , 104-M via a network 106. For the purpose of explanation and clarity, the user devices 104-1, 104-2 . . . 104-M, are hereinafter collectively referred to as user devices 104 and hereinafter individually referred to user device 104. Further, the real time performance monitoring system 102 may comprise of a plurality of data storage locations 108-1, 108-2 . . . 108-N to collect the metrics upon a request from a user device 104. In an implementation, data storage location DSL 108-1 . . . 108-N may be a plurality of locations for collecting metrics data pertaining to one metric. In an example, when the system is configured to capture "P" metrics, then DSL 108-1 . . . 108-NP may be required, where N and P are positive integers. Thus, data pertaining to different metrics may be stored in different data storage locations 108.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and the like. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, and routers for providing a link between the real time performance monitoring system 102 and the user devices 104. The network devices within the network 106 may interact with the real time performance monitoring system 102 and the user device 104 through the communication links.

The real time performance monitoring system 102 and the user devices 104 can be implemented as any of a variety of conventional computing devices including, for example, servers, a desktop PC, a notebook or a portable computer, a workstation, a mainframe computer, and an Internet appliance.

The real time performance monitoring system 102 herein referred to as the system 102, amongst other components consists of a selection module 110 and a data collection module 112. Data pertaining to metrics of an application running on the system 102 may be referred to as metrics data. The metrics data may be indicative of the performance of the application. In order to monitor the performance of the application, a metrics collection request may be received from the user device 104. Upon receiving the metrics collection request, the selection module 110 may be configured to initiate a selection mechanism to select a data storage location from a plurality of data storage locations, for transferring the metrics data pertaining to the application to the user device 104. The selection mechanism may be based on location status of each of the plurality of the data storage locations. The location status may indicate that whether a data storage location is read-only or write-only.

The location status may be based on a default status of the storage locations. The default status may indicate which data storage location is open for writing and which data storage is open for reading, before the first metrics data collection request is received. Thus, default status may be preset, for example, by a user. In an implementation, upon receiving a metrics collection request, one or more data collect signals may be generated periodically to collect the metrics data pertaining to the application. The periodic generation of the data collect signals may be referred to as the polling mechanism.

In an example, if the data transfer status indicates that previous transfer was successful, the data collection module 112 may be configured to transfer the metrics data from the selected data storage location to a data store 114. In an implementation, the data store 114 may include but is not limited to databases, flat files and other forms of data repositories. On the other hand, if the previous transfer had failed, the selection mechanism may be bypassed. On such instances, the data store 114 may be updated with the metrics data from a data storage location selected for previous metrics collection request, thereby ensuring the metrics data pertaining to the previous metrics collection request is not lost during the transfer of the metrics data from the system 102 to the data store 114 and accordingly the user device 104 is provided with the required data. Although the data store 114 has been illustrated as being external to the system 102, it will be understood that the data store 114 may be internal to the system 102 in alternative implementations.

In an implementation, the selection module 110 may be configured to select a data storage location with read-only location status for transferring the metrics data. Further, the selection module 110, using the selection mechanism, simultaneously makes the location status of another data storage location, from the plurality of the data storage locations, as write-only. The metrics data corresponding to the application is written to the data storage location with the write-only location status. Thus, the read and write operations are performed concurrently without increasing overhead, ensuring loss less transfer of the metrics data and providing the metrics data for the application to the user device in real time.

Figure 2A:
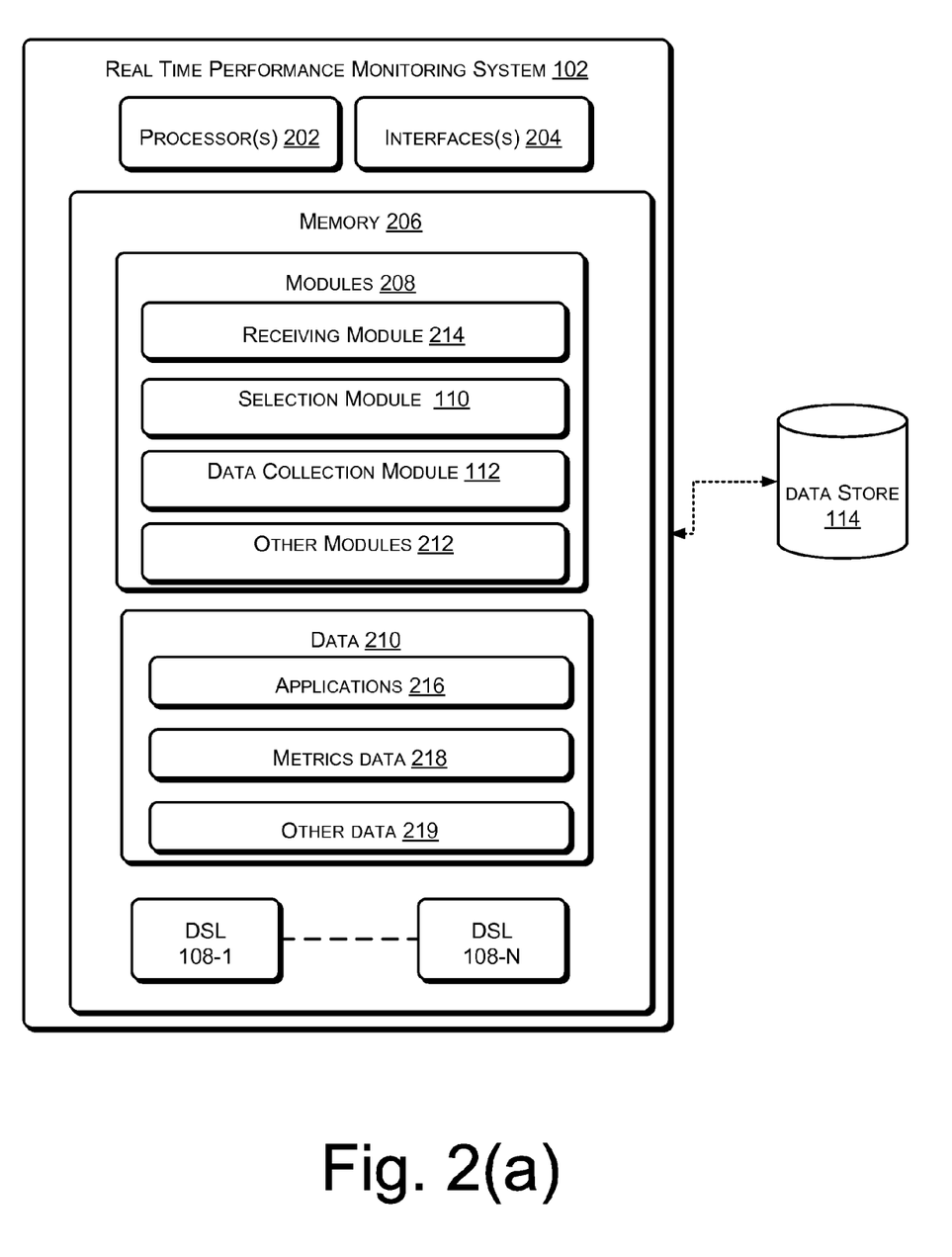
FIG. 2(a) illustrates various components of the real time performance monitoring system, according to an implementation of the present subject matter.
Figure 2B:
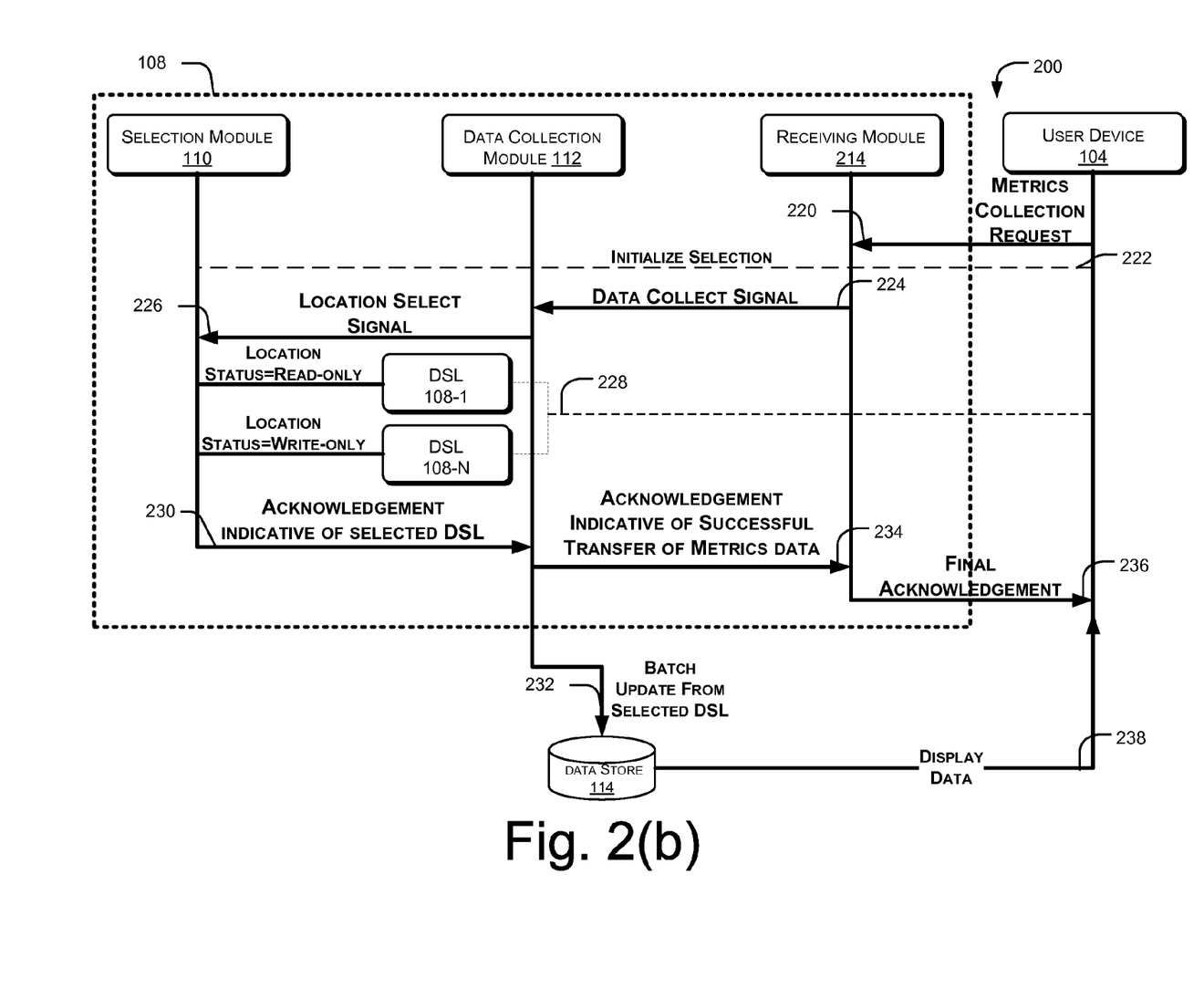
FIG. 2(b) illustrates a process flow diagram for real time performance monitoring, according to an implementation of the present subject matter.

FIG. 2(a) illustrates various components of the system 102 and FIG. 2(b) illustrates a process flow diagram 200 showing real time performance monitoring for an application by the system 102 of FIG. 2(a), according to an embodiment of the present subject matter. FIG. 2 has been explained in considerable detail with reference two data storage locations, viz, the data storage location 108-1 and the data storage location 108-2. It will be understood that concepts described herein can be extended to multiple data storage locations as well.

As illustrated, the system 102 includes one or more processor(s) 202, one or more interfaces 204 and a memory, such as a memory 206, coupled to the processor(s) 202. The interfaces 204 may include a variety of software and hardware interfaces, for example, interfaces for peripheral device(s), such as a keyboard, a mouse, an external memory, and a printer. Further, the interfaces 204 may enable the system 102 to communicate with different computing systems, such as the user devices 104. The interfaces 204 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 204 may include one or more ports for connecting the user devices 104 to each other or to another computing system or a database, such as the data store 114.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 206.

The functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non volatile storage.

The memory 206 may include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 206 includes module(s) 208 and data 210. The modules 208, amongst other things, include routines, programs, objects, components, data structures, etc., which perform particular tasks or implement particular abstract data types. The modules 208 further include, for example, a receiving module 214, the selection module 110, the data collection module 112, and other modules 212.

The data 210 serves, amongst other things, as a repository for storing data processed, received and generated by one or more of the modules 208. The data 210 includes applications 216, metrics data 218, and other data 219. The applications 216 may include the application being tested for performance. The metrics data 218 may include data generated as the result of the functioning of the data collection module 112. The other data 219 includes data generated as a result of the execution of one or more modules 208.

In implementation, the receiving module 214 may receive a metrics collection request associated with an application from the user device 104. The metrics collection request from the user device 104 may be obtained during testing of an application. The application may be stored in the applications 216, which may include one or more applications that may be executed or monitored by the system 102. It will be understood that the application 216 may be provided on an external device as well. As can be seen from the FIG. 2(b), at the step 220 the user device 104 sends the metrics collection request to the system 102. The metrics collection request may be a request obtained from a user device 104 for collection of the metrics data. Upon receiving the metrics collection request, a selection mechanism of the system 102 is initialized as shown by the step 222 of the flow diagram 200. In an implementation, after the selection mechanism is initialized, the system 102 may perform a check. This check may correspond to whether the ongoing testing phase is in operation at the time of the metrics collection request is obtained from the user device 104. Further, another check is performed in order to ensure that the system 102 is ready for starting the collection of the metrics data. In another implementation, at the initialization of the selection mechanism, the data storage location 108-1 is marked with a default status of write-only and the metrics data is collected in the data storage location 108-1. At this instance, the data storage location 108-N is not in use. Further, an acknowledgement is sent to the receiving module 214 regarding successful initialization of the selection mechanism. In another implementation, the receiving module 214 may have a scheduler (not shown) that may trigger the selection module 110 for performing the switching mechanism, after receiving the acknowledgement. Further, an acknowledgement may also be sent to the user device 104 regarding starting of the metrics data collection. Furthermore, the user device 104 may also include a scheduler (not shown) which may perform periodic checks to the data store 114 in order to get updates regarding the collection of the metrics data.

After successful initialization of the selection mechanism, the receiving module 214 sends a data collect signal to trigger the data collection module 112 as shown by the step 224. After receiving the data collect signal the data collection module 112 may trigger the selection module 110 for performing the switching mechanism. In an implementation, the data collection module 112 may trigger the selection module 110 by sending a location select signal to the selection module 110. This is shown by the step 226 of the flow diagram 200. After the location select signal is received by the selection module 110, the selection module 110 may check for the data storage location having location status as write-only. As mentioned previously, the data storage location 108-1 has the default status as write-only and the data storage location 108-N is not in operation at the initialization of the selection mechanism. Thus, the selection module 110, after performing the check, may then switch the location status of the data storage location 108-1 to read-only, while simultaneously activating the data storage location 108-N by changing its location status to write-only. This is as depicted in the step 228 of the flow diagram 200. In an implementation, the selection module after performing the switching mechanism, may then select the data storage location 108-1 for updating the data store 114. In an example, the data collect signal may be generated periodically for collection of different metrics data as requested by the user device 104.

In an embodiment, the read operation for providing the user device 104 with the metrics data is performed on the data storage location with location status as read-only. Further, metrics data cannot be written in the data storage location having location status as read-only. Further, the metrics data cannot be read from the data storage location having location status as write-only. Such a provision ensures that metrics data is simultaneously collected in the write-only data storage location and transferred, to the user device 104, from the read-only data storage location.

After successful selection of the data storage location, the selection module 110 may send an acknowledgement indicative of the selected data storage location, here data storage location 108-1, to the data collection module 112 as shown in the step 230. The data collection module 112, after receiving the acknowledgment indicative of the selected data storage location, may perform batch updates of the metrics data to the data store 114 from the selected data storage location. In an implementation, the batch update may refer to updating the data content from the selected data storage locations to the data store 114 in batches.

The same is shown by the step 232 of the flow diagram 200. After successful transfer of the metrics data from the selected data storage location to the data store 114, the data collection module 112 may send an acknowledgement indicative of the successful transfer of metrics to the receiving module 214 as shown in the step 234 of the flow diagram 200.

In an implementation, the receiving module 114 may send a final acknowledgement, indicative of a success of transfer of the metrics, to the user device 104. This is as shown by the step 236 of the flow diagram 200. After receiving the acknowledgment, the user device 104 may perform a check on the data store 114 in order to obtain the transferred metrics data. Further, the user device 104 may include a Graphical User Interface (GUI) for obtaining the metrics data from the data store 114. The user device may obtain the metrics data from the data store 114 as depicted by the step 238 of the flow diagram 200.

In an embodiment, the exchange of acknowledgments across various modules of the system 102 reduces the chances of data loss of the metrics data as all the process are in sync with each other. In an example, the other modules 212 may be used for processing secondary functions such as synchronization between the user device 104 and the system 102. Further, sending periodic acknowledgements may also result in channelizing the metrics data across the system 102 in a way that metrics data for every collected metrics is transferred securely to the user device 104.

Figure 3:
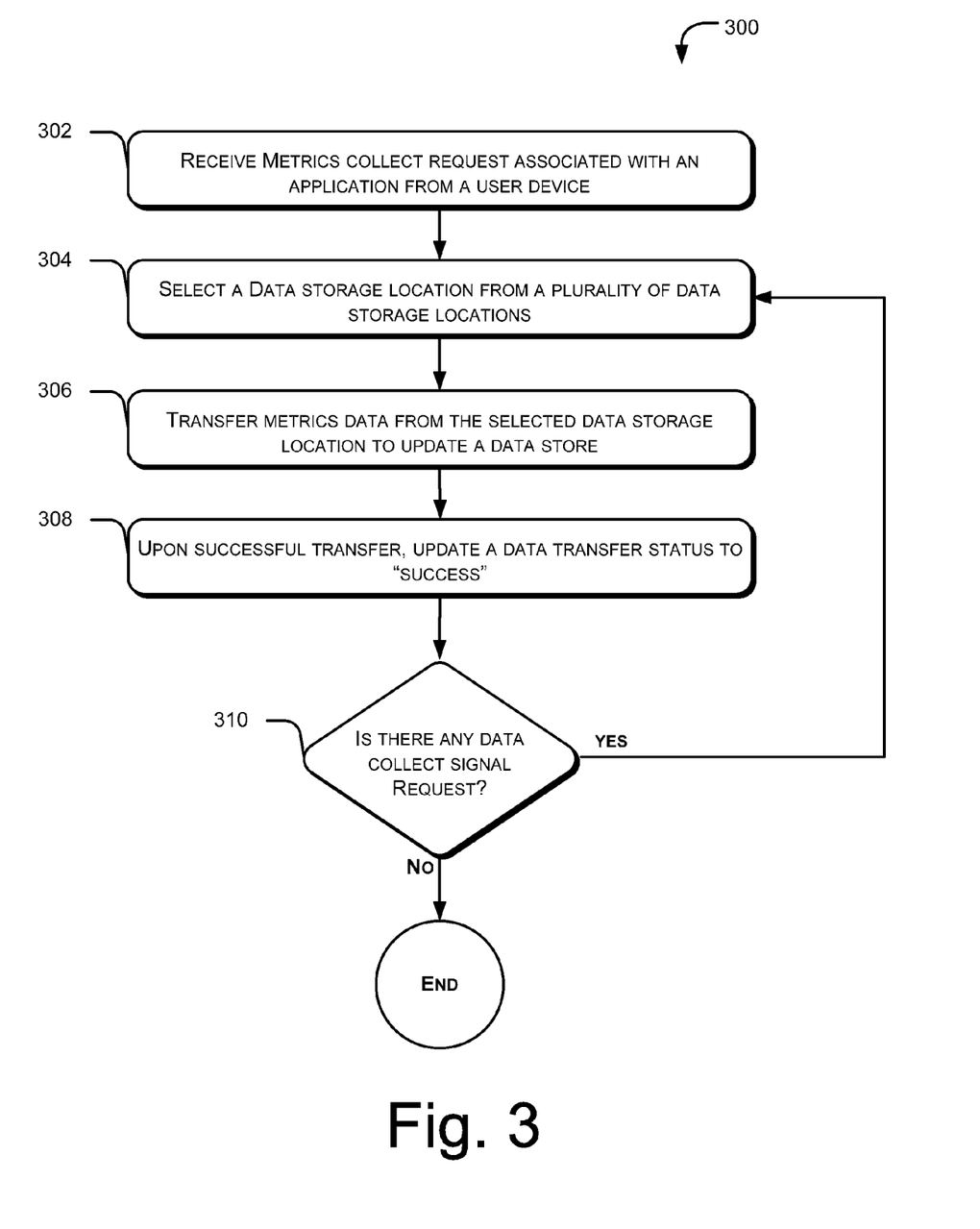
FIG. 3 illustrates a method for implementing the real time performance monitoring system, according to an implementation of the present subject matter.
Figure 4:
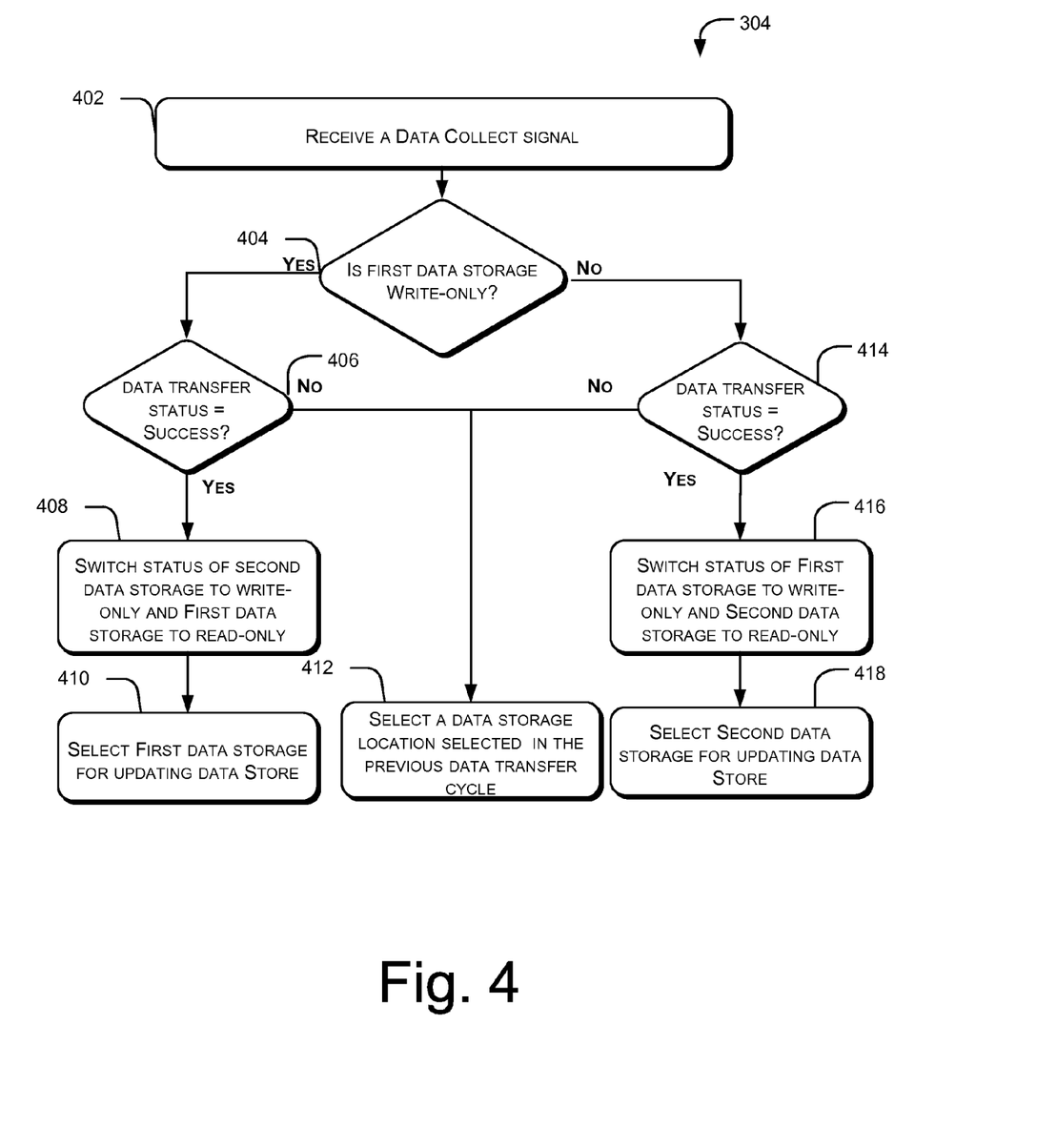
FIG. 4 illustrates a data storage location selection mechanism, according to an implementation of the present subject matter.

FIG. 3 illustrates a method 300 for performing real time performance monitoring of an application, in accordance with an implementation of the subject matter. FIG. 4 illustrates the data storage selection mechanism as according to an embodiment of the present subject matter.

The methods may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

The order in which the methods are described is not intended to be construed as a limitation, and any number of the described method blocks can be combined in any order to implement the method, or an alternative method. Additionally, individual blocks may be deleted from the methods without departing from the spirit and scope of the subject matter described herein. Furthermore, the method can be implemented in any suitable hardware, software, firmware, or combination thereof.

Referring to FIG. 3, at the block 302, a metrics collection request associated with an application is received from a user device, such as the user device 104. In one example, the metrics collection request may be received by the receiving module 214 of system 102. The application, for example, may be stored in the applications 216.

At block 304, upon receiving the metrics collection request, a data storage location, such as the data storage location 108-1 is selected from a plurality of data storage locations, such as the data storage locations 108. The data storage location is selected based on a location status associated with each of the data storage locations. The location status associated with the data storage locations may be based on at least one of default status. The selection of the data storage location is explained in detail with reference to description of FIG. 4.

At the block 306, data corresponding to the metrics, i.e., metrics data, is transferred from the selected data storage location to update a data store, such as the data store 114, to provide the metrics data to the user device 104. In an embodiment, the data store 114 is updated in parallel with the write operation of the other data storage locations. Thus, the user is provided with the metrics data during the ongoing testing phase in real time. Such a provision accounts for an increase in the computational efficiency of the system in which the application is running In another embodiment of the present subject matter, the metrics data is updated in the data store 114 in batches from where the metrics data may be provided to the user device 104. This further reduces the overhead of the machine. In an implementation, the metrics data may be used by the user in order to monitor the performance of the running application on the basis of the metrics.

At the block 308, upon successfully transferring the metrics data, the location status of the selected data storage location is switched to write-only indicating that the selected data storage location is open for write operations. Further, upon successful data transfer, a data transfer status of the previous data transfer cycle may indicate that the data transfer was successful. The previous data transfer cycle may correspond to transfer of metrics data from the selected data storage location to the data store at the previous data collect signal.

At block 310, it is determined whether there is any other data collect signal corresponding to the application. In an example, the selection module determines whether there is any other data collect signal. If it is determined that there is another data collect signal ("Yes" branch from block 310), the method 300 continues from the block 304, where again a data storage location is selected and accordingly the data store is updated to provide the metrics data to the user device 104 in real time. On the other hand, if there are no data collect signals ("No" branch from block 310), the method 300 ends as indicated by block 312.

Referring to FIG. 4, a method 304 for selection of a data storage location, according to an embodiment of the present subject matter. According to an embodiment of the present subject matter, the data storage location selection mechanism is triggered after the metrics collection request is obtained from the user device 104. In an implementation, the method 304 is performed by the selection module 110. Data storage location selection mechanism may be performed in order to ensure that simultaneous read and write operations of the metrics data may be realized. Such a provision accounts for loss less metrics data transfer and reduced overhead of a machine, such as the system 102 in which the application is running As depicted, at block 402, a data collect signal is received. In an example, once the metrics collection request is received, the selection mechanism for selecting a data storage location may be triggered and accordingly a data collect signal may be received to ensure that the metrics data for the application are provided in real time to the user device. In an example, the data collection module 112 may receive the data collect signal from the receiving module 214.

At block 404, after the data collect signal is received, it is determined whether a location status of a first data storage location, such as the data storage location 108-1 is write-only. In an example, the selection module 110 determines whether the data storage location has a write-only location status. The location status of a data storage location may be determined based on the default status. For example, upon receiving a first data collect signal, the default status of a first data storage location may indicate that it is write-only and the metrics data may have been already updated in the first data storage location before the first data collect signal is received. In another example, consider that one data transfer cycle has completed and the data collection request received at block 402 is a subsequent data collection request. In said example, metrics data has already been transferred from the first data storage location during the first data transfer cycle and new metrics data are yet to be written into the first data storage location, therefore, the location status of the first data storage location may be write-only. Accordingly, a data storage location having a write-only location status is identified.

If at block 404, it is determined that the first data storage location has a write-only location status, ("Yes" branch from block 404), the method 304 branches to block 406. At block 406, it is determined whether a data transfer status is successful. The data transfer status indicates whether the transferring of the metrics data to the data store in the previous data transfer cycle was successful or not. If the data transfer was successful ("Yes" branch from block 406), the method 304 branches to block 408. At block 408, the location status of the first data storage location is switched to read-only and a location status of a second data storage location is switched to write-only. Accordingly, the metrics data for the current data collection cycle are written in to the second data storage location having write-only location status.

At block 410, the first data storage location is selected for updating the data store. In one example, the selection module 110 selects the identified data storage location.

Referring back to block 406, if it is determined that the data transfer status for a previous data transfer cycle was not successful ("No" branch from block 406), the method 304 branches to block 412. At block 412, a data storage location, which was selected in the previous data transfer cycle, is again selected for updating the data store. In the present case it is the second data storage location. This ensures that metrics data is preserved in the selected data storage location until successfully transferred.

Referring back to block 404, if it is determined that the location status of the first data storage location is not write-only ("No" branch from block 404), i.e., the location status of the second data storage is write-only, the method branches to the block 414. At the block 414 it is determined whether a data transfer status is successful. The data transfer status indicates whether the transferring of the metrics data to the data store in the previous data transfer cycle was successful or not. If the data transfer was successful ("Yes" branch from block 414), the method 304 branches to block 416. At block 416, the location status of the second data storage location is switched to read-only and a location status of a first data storage location is switched to write-only. At block 418, the second data storage location is selected for updating the data store. In one example, the selection module 110 selects the identified data storage location.

Referring back to block 414, if it is determined that the data transfer status for a previous data transfer cycle was not successful ("No" branch from block 414), the method 304 branches to block 412. At block 412, a data storage location, which was selected in the previous data transfer cycle, is again selected for updating the data store. In the present case it is the first data storage location. This ensures that metrics data is preserved in the selected data storage location until successfully transferred.

Although embodiments for methods and systems for real time performance monitoring have been described in a language specific to structural features and/or methods, it is to be understood that the invention is not necessarily limited to the specific features or methods described. Rather, the specific features and methods are disclosed as exemplary embodiments for real time performance monitoring.

We claim:

1. A method for real time monitoring of performance of a software application, the method comprising:
   receiving, from a user device, a metrics collection request associated with the software application;
   selecting, in response to the metrics collection request, a data storage location from a plurality of data storage locations, wherein the selecting is based on a location status associated with each of the plurality of data storage locations, and wherein the selecting further comprises:
      determining whether the location status associated with the data storage location is write-only;
      ascertaining, if the location status of the data storage location is write-only, whether a data transfer status of a previous data transfer cycle indicates that the previous data transfer cycle was successful; and
      switching the location status of the data storage location to read-only to select the data storage location from the plurality of data storage locations, when the data transfer status indicates that the previous data transfer cycle was successful; and
   providing, for displaying on a display of the user device, metrics data from the selected data storage location to monitor the performance of the software application.

2. The method as claimed in claim 1, wherein the location status is one of read-only and write-only.

3. The method as claimed in claim 1, wherein the location status is based on at least one of the data transfer status of the previous data transfer cycle and a default status.

4. The method as claimed in claim 1, wherein the providing further comprises transferring the metrics data from the selected data storage location to a data store associated with the user device.

5. The method as claimed in claim 1, wherein the method further comprises triggering a polling mechanism to periodically generate a data collect signal, in response to the receiving.

6. The method as claimed in claim 5, wherein the method further comprises ascertaining whether the data collect signal is received, and selecting of the data storage location when the data collect signal is received.

7. The method as claimed in claim 1, wherein the method further comprises deleting the metrics data from the data storage location, when the data transfer status of the previous data transfer cycle indicates that the previous data transfer cycle was successful.

8. The method as claimed in claim 1, wherein the method comprises switching the location status of another data storage location from among the plurality of data storage locations to write-only, wherein the metrics data for a current data transfer cycle is written into the another data storage location.

9. The method as claimed in claim 1, wherein the method comprises retaining the location status of the data storage location for a current data transfer cycle, when the data transfer status indicates that the previous data transfer cycle was not successful and wherein another data storage location selected in the previous data transfer cycle is selected for providing the metrics data in the current data transfer cycle.

10. A real time performance monitoring system comprising:
  a processor; and
  a memory coupled to the processor, the memory comprising:
    a receiving module configured to receive, from a user device, a metrics collection request for monitoring a performance of a software application;
    a selection module configured to: select a data storage location from a plurality of data storage locations, wherein the selection is based on a location status associated with each of the plurality of data storage locations, and wherein the selection module is further configured to:
      determine whether the location status associated with the data storage location is write-only;
      ascertain, if the location status of the data storage location is write-only, whether a data transfer status of a previous data transfer cycle indicates that the previous data transfer cycle was successful; and
      switch the location status of the data storage location to read-only to select the data storage location from the plurality of data storage locations, when the data transfer status indicates that the previous data transfer cycle was successful; and
    a data collection module configured to provide, to the user device, metrics data from the selected data storage location to monitor the performance of the software application.

11. The real time performance monitoring system as claimed in claim 10, wherein the receiving module is further configured to trigger a polling mechanism to periodically generate a data collect signal, in response to the receiving.

12. The real time performance monitoring system as claimed in claim 10, wherein the selection module is further configured to ascertain whether the data collect signal is received, and selecting of the data storage location when the data collect signal is received.

13. The real time performance monitoring system as claimed in claim 10, wherein the selection module is further configured to retain the location status of the data storage location for the current data transfer cycle, when the data transfer status indicates that the previous data transfer cycle was not successful, and wherein another data storage location selected in the previous data transfer cycle is selected for providing the metrics data in a current data transfer cycle.

14. The real time performance monitoring system as claimed in claim 10, wherein the selection module is further configured to switch the location status of another data storage location from among the plurality of data storage locations to write-only, wherein the metrics data for a current data transfer cycle is written into the another data storage location.

15. The real time performance monitoring system as claimed in claim 10, wherein the data collection module is further configured to transfer the metrics data from the selected data storage location to a data store associated with the user device.

16. A non-transitory computer-readable medium having embodied thereon a computer program for executing a method comprising:
  receiving, from a user device, a metrics collection request associated with a software application;
  selecting, in response to the receiving, a data storage location from a plurality of data storage locations, wherein the selecting is based on a location status associated with each of the plurality of data storage locations, wherein the selecting comprises,
    determining whether the location status associated with a data storage location is write-only;
    ascertaining, if the location status of the data storage location is write-only, whether a data transfer status of a previous data transfer cycle indicates that the previous data transfer cycle was successful; and
    switching the location status of the data storage location to read-only to select the data storage location from the plurality of data storage locations, when the data transfer status indicates that the previous data transfer cycle was successful; and
  providing, to the user device, metrics data from the selected data storage location to monitor a performance of the software application.

17. The non-transitory computer-readable medium as claimed in claim 16, wherein the method further comprises:
  deleting the metrics data from the data storage location, when the data transfer status of the previous data transfer cycle indicates that the previous data transfer cycle was successful; and
  retaining the location status of the data storage location for the current data transfer cycle, when the data transfer status indicates that the previous data transfer cycle was not successful and wherein another data storage location selected in the previous data transfer cycle is selected for providing the metrics data in a current data transfer cycle.

* * * * *